United States Patent [19]

Mitsuka

[11] Patent Number: 4,679,155

[45] Date of Patent: Jul. 7, 1987

[54] METHOD AND SYSTEM FOR PROCESSING IMAGE DATA IN REPRODUCING IMAGES

[75] Inventor: Ikuo Mitsuka, Kusatsu, Japan

[73] Assignee: Dainippon Screen Mfg. Co., Ltd., Japan

[21] Appl. No.: 625,784

[22] Filed: Jun. 26, 1984

[30] Foreign Application Priority Data

Aug. 27, 1983 [JP] Japan .................................. 58-156920

[51] Int. Cl.⁴ .......................... G09G 1/28; H04N 1/46
[52] U.S. Cl. .................................. 364/525; 358/256; 382/47
[58] Field of Search ................ 364/525; 358/256, 280, 358/285, 288, 300, 302; 382/45, 47, 48

[56] References Cited

U.S. PATENT DOCUMENTS

| 4,194,221 | 3/1980 | Stoffel ................................ 358/280 |
| 4,214,276 | 7/1980 | Pugsley et al. ..................... 358/256 |
| 4,342,052 | 7/1982 | Rackley et al. ................. 358/256 X |
| 4,495,521 | 1/1985 | Nagoh ................................ 358/256 |
| 4,532,602 | 7/1985 | DuVall ............................. 382/47 X |
| 4,536,848 | 8/1985 | d'Entremont et al. ......... 364/525 X |
| 4,549,223 | 10/1985 | Ozawa ............................... 358/300 |
| 4,564,865 | 1/1986 | Yamada ............................. 382/47 |

FOREIGN PATENT DOCUMENTS

| 2729113 | 5/1978 | Fed. Rep. of Germany . |
| 2948341 | 10/1980 | Fed. Rep. of Germany . |
| 5872679 | 5/1958 | Japan . |
| 2133655 | 12/1982 | United Kingdom . |
| 2136244 | 3/1983 | United Kingdom . |

Primary Examiner—Errol A. Krass
Assistant Examiner—H. R. Herndon
Attorney, Agent, or Firm—Lowe, Price, LeBlanc, Becker & Shur

[57] ABSTRACT

The method and system of this invention is capable of obtaining image data which underwent a layout process such as coordinate rotation and shifting processes, a trimming process and so forth at first by scanning a specific number of scanning lines of each original picture in accordance with layout data, then by storing the image data from the scanning to a memory in accordance with another layout data.

7 Claims, 8 Drawing Figures

METHOD AND SYSTEM FOR PROCESSING IMAGE DATA IN REPRODUCING IMAGES

FIELD OF THE INVENTION

This invention relates to a method and system for processing image data in reproducing images by using an image reproducing system in which image data obtained by scanning an original picture are once stored into a memory and then read to be used for recording a reproduction image, particularly to such a method and system which is capable of performing a real-time layout process simply.

BACKGROUND OF THE INVENTION

A conventional layout scanner system which can electronically make up an original using image data of plural original pictures comprises functional steps of storing image data obtained by scanning plural original pictures into the first memory, carrying out a layout work including coordinate rotation and shifting works on the image data, storing the laid-out image data into the second memory, and outputting them to a recording head.

In this, each of the memories must have large capacity to perform finer data processing, which pushes up the cost of the scanner system.

Furthermore, as such a conventional layout scanner has restrictive factors mechanically and electronically as mentioned below in terms of reproducing images rapidly, it is not suitable for extensive and urgent image reproduction.

One of the restrictive factor is that the input scanning speed thereof is limitted by the mechanical parts of its input unit whether it is a drum type or a light beam deflective type. For example, in a drum scanner, it takes about 100 ms to sweep one scanning line. Another of the restrictive factors is that as the image data of plural original pictures stored in the first memory must once be output to undego a layout process electronically before being input to the second i.e. the final memory, which procedure requires considerable time.

Of course the original pictures can be placed in desired places and angles in the input side, but the placement work is hardly accomplished minutely without making use of a special scanner system.

SUMMARY OF THE INVENTION

A prime object of this invention is to obtain a method and system for simply carrying out a layout work including coordinate rotation and shifting works on image data in reproducing images.

The above and other objects can be attained, in accordance with the invention, by placing a plurality of originals to be reproduced on a base plate, determining reproduction data including scanning start and stop points of each original and a corresponding reproduced image respectively, a desired magnification and a scanning angle relative to each original and storing the reproduction data in a storage means. A first track of at least two originals is scanned with a predetermined number of scanning lines under control of the reproduction data, to obtain first image data of the originals for storage in a first memory means. A second track of the at least two originals is scanned with the same predetermined number of scanning lines under control of the reproduction data, to obtain second image data of the originals for storage in a second memory while the first image data from the first memory is simultaneously retrieved under control of the reproduction data. Additional tracks of the at least two originals are scanned in the same manner while alternately changing storing and retrieving functions of the first and second memory means, and lines of the tracks are successively recorded to provide reproduced images in a desired layout.

The above and other object and features of this invention can be appreciated more fully from the following detailed description when read with reference to the accompanying drawings.

PREFERRED EMBODIMENT OF THE INVENTION

Figure 1A:
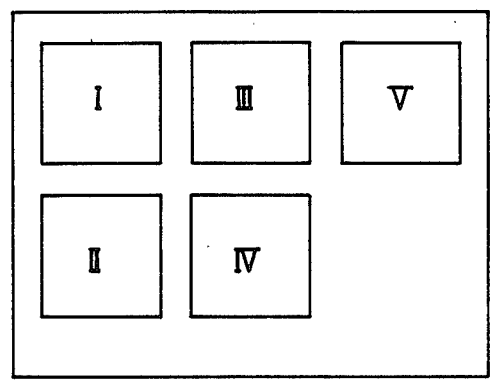
FIGS. 1a and 1b each show an embodiment of the method of this invention.
Figure 1B:
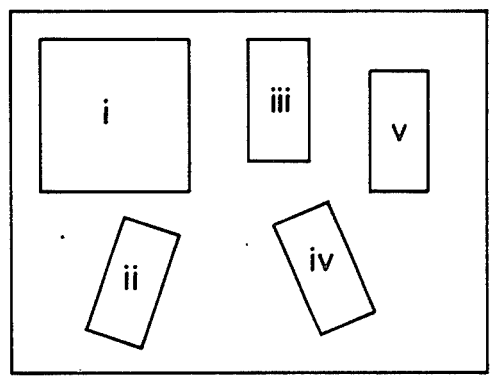

FIG. 1 shows an embodiment of the method of this invention, in which reproduction images i, ii, iii, iv and v located as shown in FIG. 1(b) are obtained by carrying out a layout work including coordinate rotation and shifting works and a magnification conversion work on the image data of the corresponding original pictures I, II, III, IV and V arranged as shown in FIG. 1(a). In this, the locations of the original pictures are approximately determined in the input side supposing the state of reproduction images thereof, while the other layout work is carried out electronically.

Figure 2B:
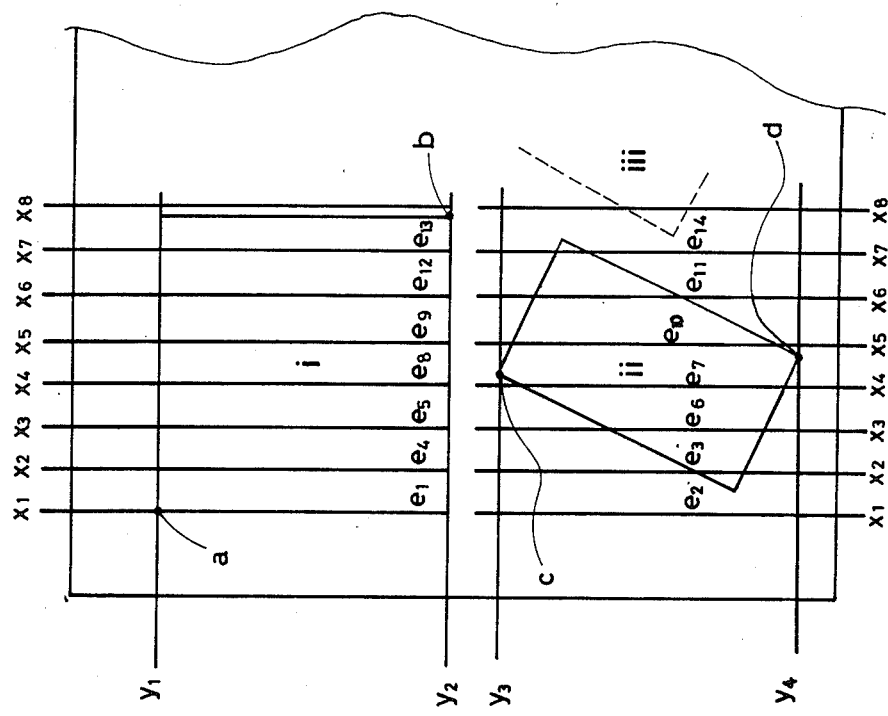
FIGS. 2a and 2b show the conception of the method of this invention.
Figure 2A:
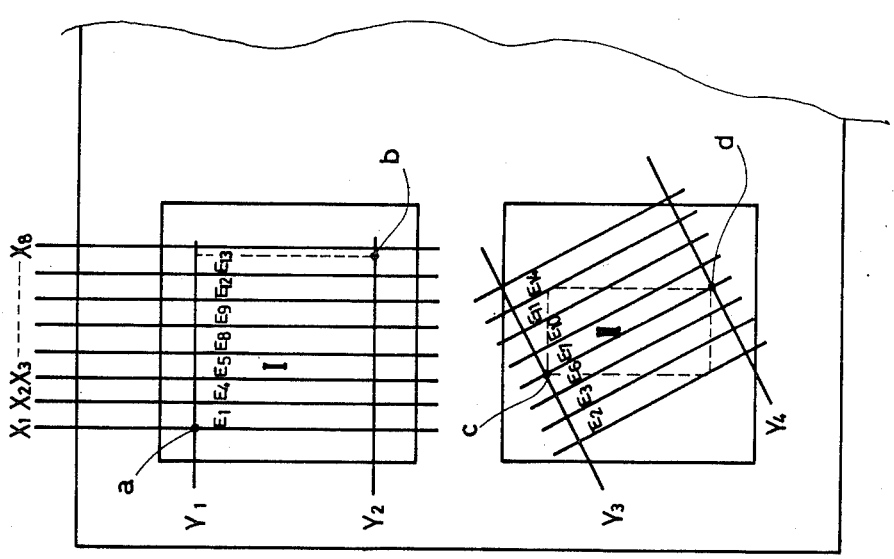

FIG. 2 shows the conception of the method of this invention, in which reproduction images as shown in FIG. 2(b) are recorded through said layout process using the image data obtained by scanning the corresponding original pictures arranged as shown in FIG. 2(a) by means of an input scanning unit 23 (mentioned later on FIG. 4) under the condition as shown in Table 1.

In FIG. 2, each of Areas $E_1$, $E_2$ ... of the original pictures I and II consists of, for example, one hundred scanning lines, and Areas $e_1$, $e_2$ ... of the reproduction images i and ii correspond to the Area $E_1$, $E_2$... respectively.

Figure 4:
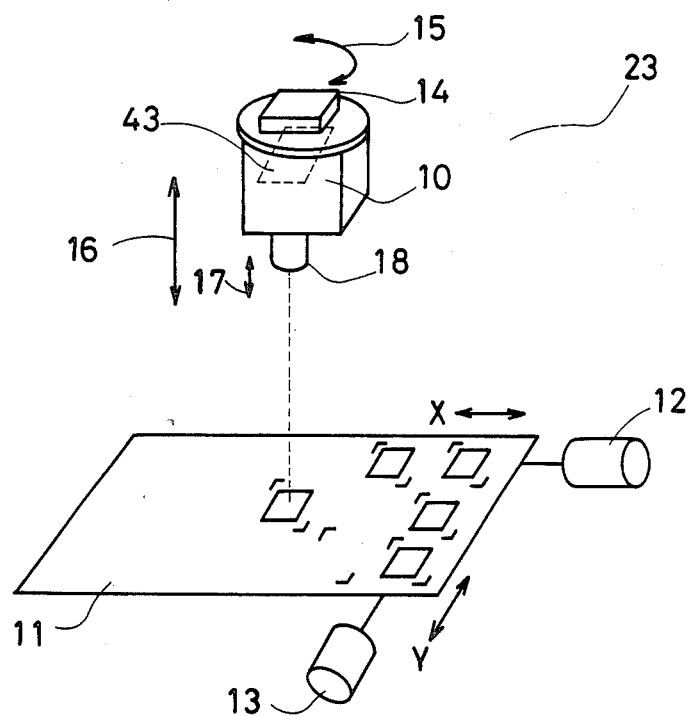
FIG. 4 shows an embodiment of the input scanning system of this invention.

FIG. 4 shows an example of said input scanning unit 23. In the unit 23, an original picture table 11 can be shifted in X direction by a motor 12 and in Y direction by a motor 13, and original pictures placed on the table 11 can be scanned by a pickup camera 10. The camera 10 comprises a mono-dimentional or two-dimensional photo-sensor (for example, a CCD photo-sensor) 43 as a pickup device, and is capable of varying the magnification ratio by varying the distance between the pickup device and the original picture table 11 (in the direction shown by arrows 16 and 17).

The motors 12 and 13 are equipped with unindicated rotary encoders respectively, of which output signals are used for driving the original picture table 11 as in the way mentioned later. While the camera 10 is accompanied by a rotary encoder, of which output signal controls the angular position thereof.

Furthermore, the main scanning direction can be varied by rotating a rotation base 14 to which the camera 10 is attached (indicated by an arrow 15), in other words, by varying the angle between the photo-sensor 43 and the original pictures as mentioned later. The unit 23 operates under the control of a CPU as in the way mentioned later.

Figure 3:
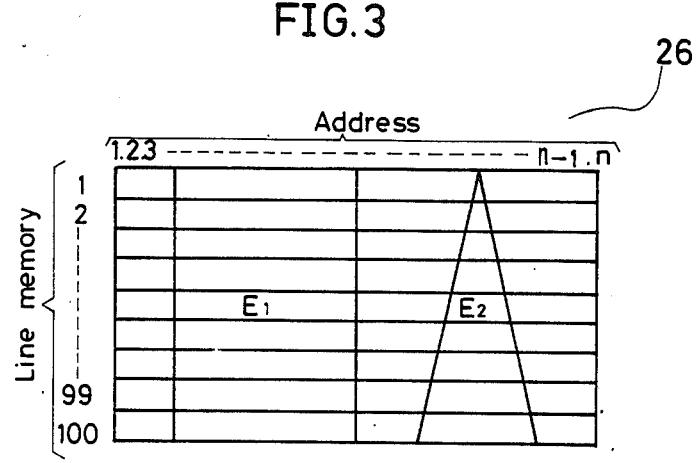
FIG. 3 shows the function of a memory of this invention.

At first, the position of the original picture table, the distance between the pickup camera and the table, and the angle of the camera to the table of the input scanning unit 23 are determined by data of the scanning start point XY, the magnification ratio M (in Table 1, M=2) and the angle $\theta$ (in Table 1, $\theta=0°$) of the main scanning direction for the initial scanning line being input from the CPU. Then by scanning Area $E_1$ of the original picture I, image data of plural (for example, one hundred) scanning lines corresponding to Area $E_1$ are obtained and are input to a memory 26. In this, the memory 26 accepts only the image data which have already undergone a trimming process (mentioned later). Then the CPU inputs the second scanning data to the input scanning unit 23. Thereupon, by scanning Area $E_2$ of the original picture II, image data of Area $E_2$ (consisting of the scanning lines of the same number as that of Area $E_1$) are obtained and are input to the memory 26 as shown in FIG. 3.

The memory 26 comprises single or plural memory unit(s), each of which is capable of storing image data of a certain number of scanning lines (in the above case, one hundred scanning lines). Moreover, image data of Pth ($1 \leq P \leq 100$) scanning line of each Area $E_1$ ($E_2$ . . . ) are to be stored into Pth line memory.

Figure 5:
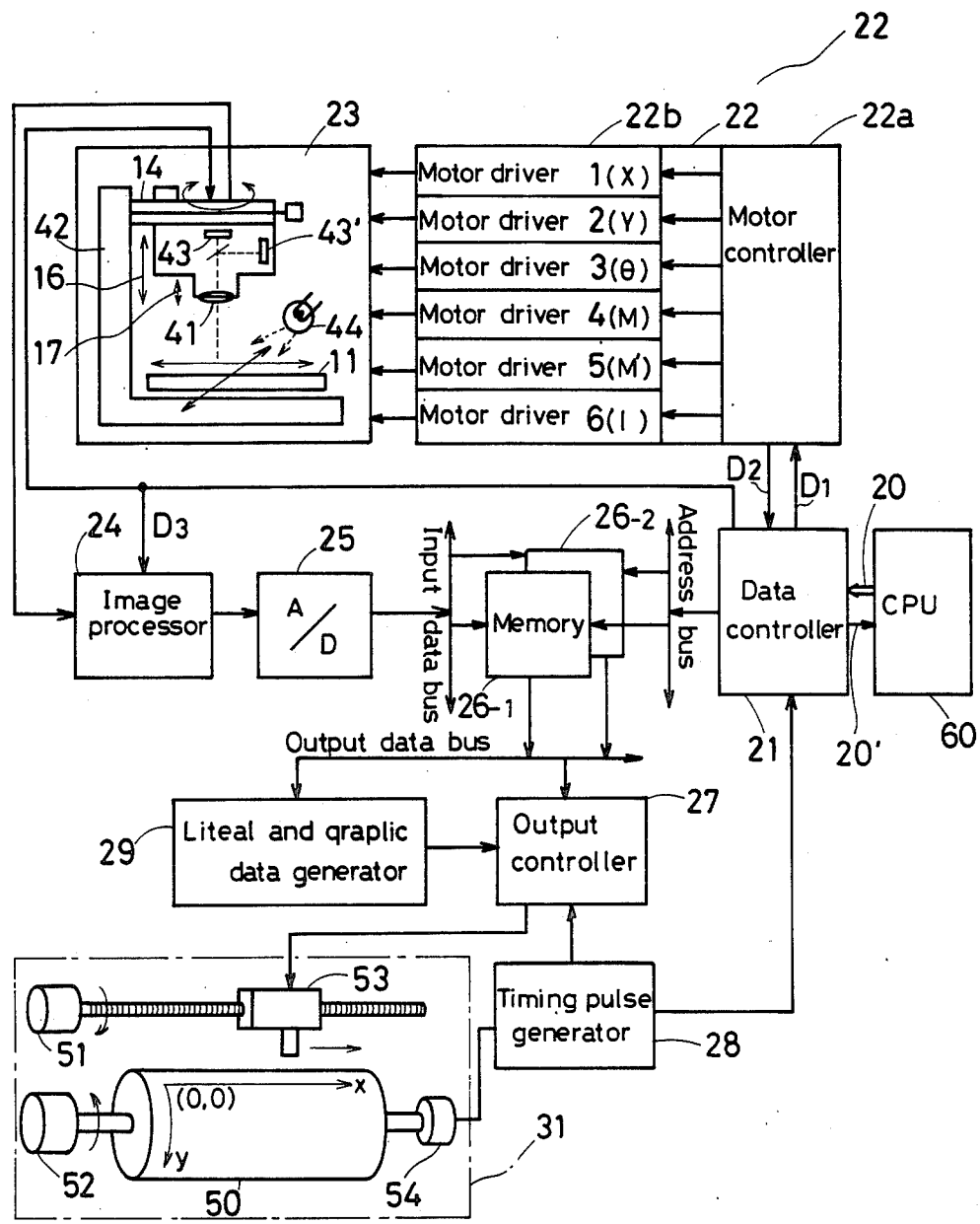
FIG. 5 shows an embodiment of the system of this invention.

Thus obtained image data are read from the memory to be used for recording a reproduction image on a photosensitive film by means of a conventional recording unit as shown in FIG. 5.

Image data of Area $E_3$ and $E_4$ are stored in the memory 26 in the same manner, and are read to be used for the recording process.

When the memory 26 comprises one memory unit, the memory unit must be used for the writing process and the reading process alternately. When the memory 26 comprises two memory units, while the writing process is carried out on one of the memory units, the reading process is carried on the other, which can increases the operation speed of the whole scanner system.

In the above, the scanning work can be carried out on Areas $E_1$, $E_2$ . . . for example, in order of Area $E_1 \rightarrow$ Area $E_2 \rightarrow$ Area $E_4 \rightarrow$ Area $E_3$. However, in this case, the camera 10 must take the trouble to shift from the end point of Area $E_2$ to the start point of Area $E_4$. To avoid consuming the shifting time, the scanning order had better be in order of Area $E_1 \rightarrow$ Area $E_2 \rightarrow$ Area $E_3 \rightarrow$ Area $E_4$. What is important in this case is to store the image data obtained by the photo-sensor 43 into proper locations of the memory unit to make them line up in a desired order for the recording process.

Meanwhile, when one memory unit must store image data of plural original pictures (for example, image data of Area $e_{14}$ comprises image data of two original pictures II and III), the image data must be stored into proper locations of the memory unit as well as in the privious case.

FIG. 5 shows an embldiment of the system of this invention. As the input scanning unit 23 is already explained on FIG. 3, no detailed explanation is given in the following description.

A recording unit 31 is constructed as follows. A recording drum 50 is revolved by a motor 52, while a recording head 53 being located against the drum 50 can be shited along a feeding gear being revolved by a motor 51. A rotary encoder 54 revolved coaxially with the drum 50 outputs a single pulse (generated once a revolution of the recording drum 50) and a multiple pulse (generated multiple times a revolution of the recording drum 50) to a timing pulse generator 28. The timing pulse generator 28 generates a series of timing pulses necessary for controlling the whole system by using said two pulses and input them to a data controller 21 and to an output controller 27 as mentioned later.

A CPU 60 computes the scanning start point XY ($X_1Y_1$, $X_2Y_2$ . . . ) of each area according to position data of the input and the output sides, magnification ratio M and the rotation angle $\theta$ of the camera 10 being input thereto as in the manner mentioned later. Thus obtained scanning start point data XY ($X_1Y_1$, $X_2Y_2$ . . . ), data of the magnification ratio M and data of the rotation angle $\theta$ of the camera 10 are input to a motor controller $22_a$ of a position controller 22 via a data controller 21 as data $D_1$. At the same time, data necessary for reproducing images such as of density designation, color and gradation correction and detail emphases etc. are input to an image processor 24 as data $D_3$.

Figure 6:
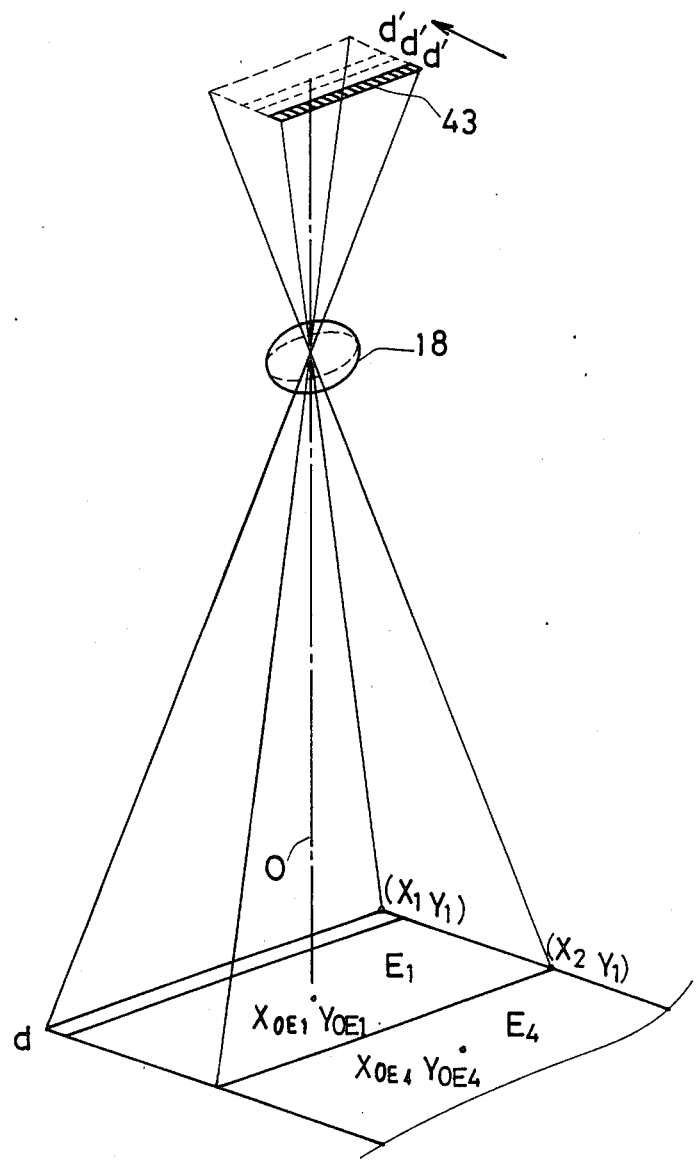
FIG. 6 shows the operation of a photo-sensor of this invention.

After that, a motor controller $22_a$ drives the motors 13 and 12 via motor drivers $22_{b1}$ and $22_{b2}$ according to the coordinate value $X_0Y_0$ ($X_{0E1}Y_{0E1}$, $X_{0E2}Y_{0E2}$ . . . ) computed by the CPU using said scanning start point data XY ($X_1Y_1$, $X_2Y_2$ . . . ) in order to make the center of the lens 18 of the camera 10 be situated on right above the point $X_0Y_0$ (for example $X_{0E1}Y_{0E1}$ of Area $E_1$) as shown in FIG. 6. While the motor controller $22_a$ drives the rotation base 14 via a motor driver $22_{b3}$ according to the angle data $\theta$ to set the main scanning direction. Moreover the motor controller $22_a$ moves the camera 10 and the lens 18 in the direction expressed by the arrows 16 and 17 according to the magnification data M and M' respectively.

When the above setting process is finished, the position controller 22 outputs a setting end signal $D_2$ to the data controller 21. The data controller 21 begins to read the image data from the photo-sensor 43 when the signal $D_2$ is input thereto, and input the image data to the image processor 24. The image data undergo color and gradation correction in the image processor 24, analog/digital conversion in an A/D converter 25 and are input to specified locations of the memory 26. When a mono-dimentional CCD is used as the photo sensor 43, every time image data of one scanning line (having width of "d'" on the photo sensor 43, or the width "d" on the original picture) are read, the mono-dimentional CCD shifts to the next scanning line (see FIG. 6).

Thus obtained image data in the memory 26 are output to the recording head 53 of the recording unit 31 under the control of the output controller 27. Meanwhile, literal and graphic data generated in a literal and graphic data generator 29 can be input to the recording head 53 at need.

When the image data of Area $E_1$ finish being stored into the memory 26, a writing process end signal 20 is input to the CPU 60. In response to this signal, the CPU 60 inputs necessary data signal 20 for scanning the next scanning area (in this case, Area $E_2$) to the data controller 21. By repeating the above described process for the subsequent scanning areas, image data necessary for performing a layout process are obtained.

In the embodiment of FIG. 5, the memory 26 comprises two memory units 26₋₁ and 26₋₂ to perform the data reciprocation more rapidly as mentioned before. That is, while a reading process is carried out on (the image data stored in) the memory unit 26₋₁, the writing process (for the image data of the next scanning line) is carried out on the memory unit 26₋₂.

As described briefly before, each of the memories 26₋₁ and 26₋₂ accepts only image data of necessary portion of each original picture by carrying out a trimming work (this work intends to extract a necessary portion of an image) on the image data output from the photo sensor 43 even when it picks up unnecessary data. For example, an edge trimming process is as follows. At first, original pictures are placed on the original picture table 11. Secondly, the CPU controls the distance between the original picture table 11 and the camera 10 (also including the lens 18) by using data of the magnification ratio M and the rotation angle θ of the camera 10 to the table for the scanning area to be scanned next. Thirdly, by observing the projection image on a screen 43 provided at the side of the camera 10, an operator determines the trimming start points (A) of the original picture I and (C) of the original picture II as well as respective trimming end points (B) and (D) of the original pictures I and II and input the point data into the CPU 60. In this case, the screen 43 can either be realized by an optical device such as a frosted glass with a measure or an electronic device such as a photo-sensor (the latter also needs a CRT display).

Meanwhile, respective trimming end points (B) and (D) of the original pictures I and II can also be determined by inputting data of a magnification ratio, respective recording start points a and c and end points b and d of the reproduction images i and ii and respective trimming start points A and C of the original pictures I and II via a digitizer to the CPU 60.

Data of the trimming start points (A) and (C) and the trimming end points (B) and (D) are input via the data controller 21 to the memory 26.

Incidentally, a light source 44 for the original pictures can be situated at the place shown in FIG. 5 or under the original picture table 11.

In the embodiment described above, the camera 10 can be shifted instead of the original picture table 11.

The recording unit 31 can be a laser beam type as well as be a drum type.

The numerical specification of the abovementioned embodiment is as follows. In the recording unit 31, assuming that the revolution number of the recording drum is 600 r.p.m, it takes about 0.1 sec to record 1 scanning line (1 revolution of the drum). Consequently, it takes about 10 sec to record 100 scanning lines (100 revolutions of the drum). On the other hand, in the input unit 23, when four 1024-element $CCD_s$ are used (that is, $1024 \times 4 = 4096$ elements are used) and each of 4096 CCD elements can scan one pixel in 1 sec, it takes about 0.4 sec to scan 100 scanning lines ($100 \times 4096 \times 1$ $\mu sec \approx 0.4$ sec) per one original picture. When the recording unit can record four original pictures having length of 4 in. in the main scanning direction respectively per one revolution of the recording drum under the condition of 1/1 magnification ratio, the total length corresponds to about 457 mm of the original picture table. Therefore, when the table is shifted at a speed of 1 m/sec, the length 457 mm corresponds to 0.457 sec. Consequently, it takes about 2 sec ($\approx 0.4 \times 4 + 0.457$) to scan four original pictures. In addition, when there required 1 sec to shift the table from one original picture to the next one, it takes 6 sec ($= 2 + 1 \times 4$) to scan 100 scanning lines of each of four original pictures. As can be found from the above description, necessary operation time of the input unit 6 sec is shorter than said 10 sec of the recording unit, which causes no inconvenience.

As is mentioned above, the method of this invention is capable of obtainning a laid-out reproduction image using a memory of lesser capacity without being accompanied by deterioration of image quality owing to a conventional coordinate conversion work, by setting the location of original pictures, the magnification ratio, the rotation angle of the camera and so forth in the input side.

Although the above explanation is based on a monochrome scanner system, a color image can be reproduced by using the monochrome system three times changing the color filter thereof or by using three photo-sensor units in parallel as a pickup device at a time.

TABLE 1

| Scanning order | Input scanning condition | | | Operation condition | Recording condition |
|---|---|---|---|---|---|
| | Start point (XY) | Angle (θ) | Magnification ratio (M) | Operation condition etc. | Recording Start point (xy) |
| 1 (O.P. I) | $X_1$ $Y_1$ | 0° | 2.00 | | $x_1$ $y_1$ |
| 2 (O.P. II) | $X'_1$ $Y_3$ | −54° | 1.60 | | $x_1$ $y_3$ |
| 3 (O.P. II) | $X'_2$ $Y_3$ | −54° | 1.60 | | $x_2$ $y_3$ |
| 4 (O.P. I) | $X_2$ $Y_1$ | 0° | 2.00 | | $x_2$ $y_1$ |
| 5 (O.P. I) | $X_3$ $Y_1$ | 0° | 2.00 | | $x_3$ $y_1$ |
| 6 (O.P. I) | $X'_3$ $Y_3$ | −54° | 1.60 | | $x_3$ $y_3$ |
| 7 (O.P. I) | $X'_4$ $Y_3$ | −54° | 1.60 | | $x_4$ $y_3$ |
| 8 (O.P. I) | $X_4$ $Y_1$ | 0° | 2.00 | | $x_4$ $y_1$ |
| . | . . | . | . | . | . . |
| . | . . | . | . | . | . . |

What is claimed is:

1. A method of reproducing a plurality of images arranged in a desired layout, said method comprising the steps of:
   (i) placing a plurality of originals to be reproduced on a base plate;
   (ii) determining reproduction data including scanning start and stop points of each original and a corresponding reproduced image respectively, a desired magnification and a scanning angle relative to each original;
   (iii) storing said reproduction data in reproduction data storing means;

(iv) scanning a first track of at least two originals with a predetermined number of scanning lines under control of said reproduction data to obtain first image data of said originals;

(v) storing said first image data in a first memory means;

(vi) scanning a second track of said at least two originals in the same manner as in step (iv) to obtain second image data of said originals;

(vii) storing said second image data in a second memory means while simultaneously retrieving the first image data from the first memory under control of said reproduction data;

(viii) repeating the steps (iv) through (vii) with respect to additional tracks of said at least two originals, alternately changing storing and retrieving functions of the first and second memory means; and (ix) successively recording the lines of said tracks, whereby the reproduced images are recorded on a photosensitive material in the desired layout.

2. A method as set forth in claim 1, in which the number of scanning lines is selected such that a scanning time of each track of the originals is shorter than a recording time of all scanning lines of a corresponding track.

3. A system for reproducing a plurality of images arranged in a desired layout, comprising:

a support means for supporting a plurality of originals to be reproduced;

storage means for storing desired reproduction data including scanning start and stop points of each original and a corresponding reproduced image, respectively, a desired magnification and a scanning angle relative to each original;

scanning means for scanning tracks of said originals;

first and second memory means;

memory control means for addressing storage locations in and controlling data storage and retrieval functions of said first and second memory means;

processor means responsive to said desired reproduction data for controlling said scanning means and said memory control means to:

(i) scan a first track of at least two originals with a predetermined number of scanning lines to obtain first image data;

(ii) store said first image data in said first memory means;

(iii) scan a second track of said at least two originals with said predetermined number of scanning lines to obtain second image data;

(iv) store said second image data in said second memory means while simultaneously retrieving said second image data from said second memory means; and (v) repeat (i)–(iv) with respect to additional tracks of said at least two originals while alternately changing the storage and retrieval functions of said first and second memory means; and recording means for successively recording the lines of said tracks to reproduce said plurality of images in the desired layout.

4. A system claimed in claim 3 wherein the scanning means comprises a camera with a built-in photo-sensor, a means coupled to said camera for varying a relative horizontal position of the camera to the support means, means coupled to said camera for varying a relative angular position of the camera to the support means.

5. A system claimed in claim 4 wherein the photo-sensor is a mono-dimensional photo-sensor.

6. A system claimed in claim 4 wherein the photo-sensor is a two-dimensional photo-sensor.

7. A system claimed in claim 4 which is provided with three photo sensors for scanning three color components of red, green and blue of a color original picture.

* * * * *